Aug. 16, 1932.    E. F. ROSSMAN    1,871,918
OSCILLATING JOINT
Filed Aug. 15, 1929
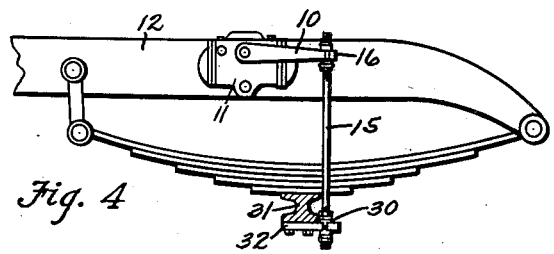
Fig. 4
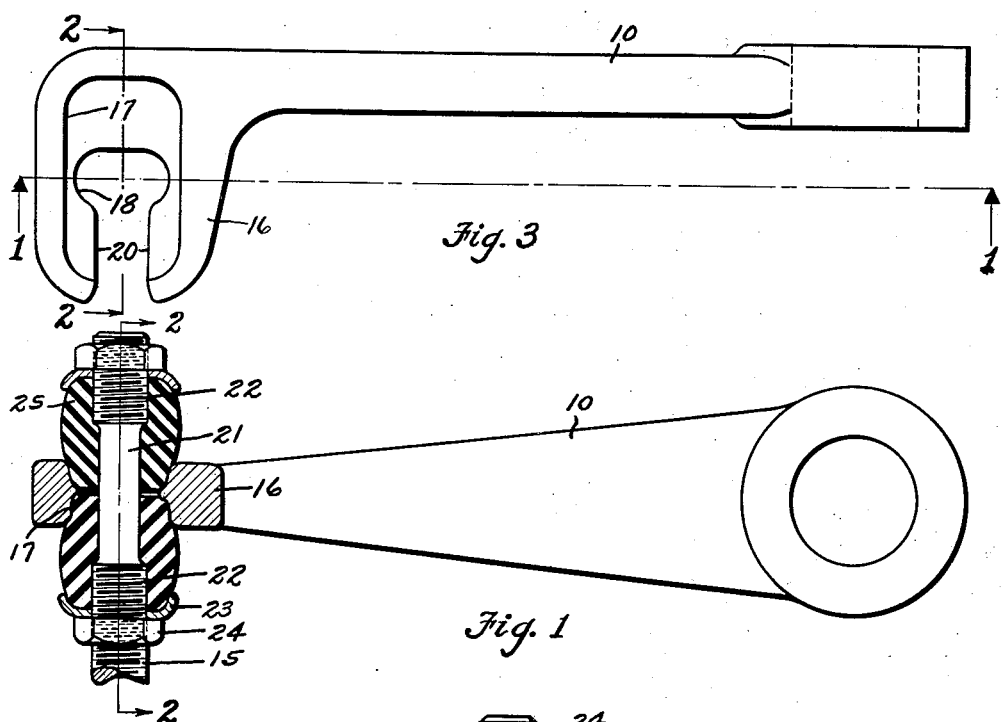
Fig. 3
Fig. 1
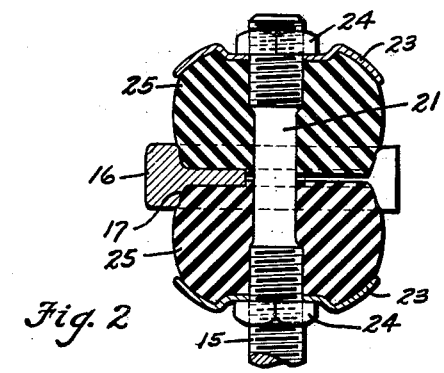
Fig. 2
Inventor
Edwin F. Rossman
By Spencer Hardman & Fehr
His Attorneys Patented Aug. 16, 1932

1,871,918

UNITED STATES PATENT OFFICE

EDWIN F. ROSSMAN, OF DAYTON, OHIO, ASSIGNOR TO DELCO PRODUCTS CORPORATION, OF DAYTON, OHIO, A CORPORATION OF DELAWARE

OSCILLATING JOINT

Application filed August 15, 1929. Serial No. 386,194.

This invention relates to metal-isolating oscillating joints interconnecting two relatively movable parts, especially such as are adapted for use on the mechanical linkage on hydraulic shock absorbers as used on present day automobiles.

An object of this invention is to provide such a joint which is simple to manufacture and install on the connected parts and which is efficient and of long life in use.

A more specific object is to provide such a joint wherein two resilient non-metallic blocks may be first assembled upon one of the connected parts and then this assembly forced into final position upon the other connected part, after which the resilient blocks may be further compressed by a simple means.

Another feature of the invention is the elongated shape of the resilient blocks whereby a greater ease of pivotal movement between the connected parts is provided for a given bearing area on said blocks.

Further objects and advantages of the present invention will be apparent from the following description, reference being had to the accompanying drawing, wherein a preferred embodiment of one form of the present invention is clearly shown.

In the drawing:

Fig. 1 shows a swinging lever arm connected to a substantially vertical thrust link by a joint made according to this invention. The joint is shown in vertical section along the line 1—1 of Fig. 3.

Fig. 2 is a section taken on line 2—2 of Figs. 1 and 3.

Fig. 3 is a plan view of the lever arm shown in Fig. 1 and illustrates particularly the design of the seat cups for the joint.

Fig. 4 illustrates somewhat diagrammatically the use of the oscillating joints of this invention for connecting the vertical thrust link to the lever arm of a hydraulic shock absorber and to a fitting fixed to the car axle.

Similar reference characters refer to similar parts throughout the several views.

Numeral 10 designates the lever arm which actuates the piston in the hydraulic shock absorber unit 11 which is rigidly fixed to the side rail 12 of the automobile chassis frame.

The thrust link 15 is connected to the outer end of lever 10 by the oscillating pivot joint of this invention shown in Figs. 1 and 2. This joint will now be described in detail.

Lever arm 10 has an enlarged end, preferably forged integral therewith, comprising an elongated seat member 16 which has elongated shallow cups 17 on its upper and lower faces. The relatively thin bottom wall of cups 17 has an elongated central aperture 18 whose long axis extends transversely to the long axis of the seat cups 17. An open slot 20 leads from the central aperture 18 through the edge of seat member 16, all as clearly shown in Fig. 3. The upper end of the thrust link 15 has a round portion 21 of somewhat smaller diameter than the width of slot 20, and screw-threaded portions 22 on each side of portion 21.

Two elongated blocks 25 of resilient non-metallic material, such as resilient rubber, are provided with central apertures sufficiently large to permit their being forced upon the upper end of link 15. Link 15 first has the lower nut 24 and the small metal cup 23 assembled thereupon, then the blocks 25 are forced over the end thereof to their approximate position, and then the upper metal cup 23 and nut 24 applied loosely upon link 15, so that the rubber blocks 25 may be spaced slightly apart. Now this assembly of link 15 and blocks 25 may be moved bodily over to the lever arm 10 after the shock absorber unit 11 has been rigidly fixed to the side rail 12, and the link and blocks forced laterally into final position upon the seat member 16 by the link 15 passing through the slot 20 while the blocks 25 slide into place in their seat cups 17 respectively on opposite sides of member 16. The nuts 24 may be screwed back just sufficiently to permit this lateral assembling to be done with the desired ease, after which these nuts 24 are tightened to put the blocks 25 under the desired initial compression as will be obvious from the drawing. The bottoms of blocks 25 conform with and fit snugly within the seat cups 17. When blocks 25 are put under initial compression (that is, their compression when there is no load upon link 15 in either direction) the resilient rubber is forced into tight contact with the inserted portion of link 15 and also is forced down within the slot 20. The portion 21 of link 15 of course is considerably smaller than aperture 18 and is substantially centered therewith when the parts are in normal position, such as shown in Figs. 1, 2 and 4.

The lower end of link 15 is shown pivotally mounted at 30 upon a fitting 32 fixed to the car axle 31. This pivot joint 30 is shown in Fig. 4 as a duplicate of the upper joint described in detail hereinabove. Fitting 32 is provided with cup seats with central aperture 18 and open slot 20 duplicating the outer end 16 of lever arm 10.

A feature of this invention lies in the convenience of installing the shock absorber upon the car chassis. The shock absorber unit 11 with its projecting lever arm 10 may be first fixed to the side rail 12 and the fitting 32 fixed to the axle 31. The link 15, having the resilient blocks 25, cups 23, and nuts 24 assembled loosely upon each end thereof, may be then easily forced laterally upon the seating members on arm 10 and fitting 32, as described herein, and the nuts 24 drawn up tight upon the blocks 25.

In operation, the lever arm 10 swings in the plane of the drawing in Fig. 1 as the car axle moves up and down relative thereto. The thrust link 15 pivots relative to arm 10 by a cocking distortion of the resilient blocks 25 in a manner obvious from viewing Fig. 1. The long axes of blocks 25 extend in the direction of the pivot axis, thus facilitating the pivotal movement in an obvious manner. The elongated plan shape of blocks 25 therefore provide a greater bearing area without correspondingly increasing the resistance to pivoting of the joint.

Obviously, the joints at both ends of link 15 will permit a certain amount of universal pivotal movement, such as will occur during "side sway" of the chassis frame relative to the axle 31.

While the form of embodiment of the present invention as herein disclosed, constitutes a preferred form, it is to be understood that other forms might be adopted, all coming within the scope of the claim which follows.

What is claimed is as follows:

A universal oscillating joint connecting two relatively movable parts comprising: a seat member rigid with one of said parts and having elongated seats on opposed faces thereof and a T-shaped slot therein, the cross of said T-shaped slot extending with the short axis of said seat and the stem of said slot extending with the long axis of said seat through the edge thereof, said other movable part comprising a rigid rod, said rod having two resilient rubber blocks mounted thereupon in slightly spaced relation, said rod with said resilient blocks thereupon being slideable laterally through said T-shaped slot to a position where said blocks seat within said opposed elongated seats, and means carried by said rod for engaging the opposed outer surfaces of said blocks and compressing same upon said seats.

In testimony whereof I hereto affix my signature.

EDWIN F. ROSSMAN.